Figure 1:
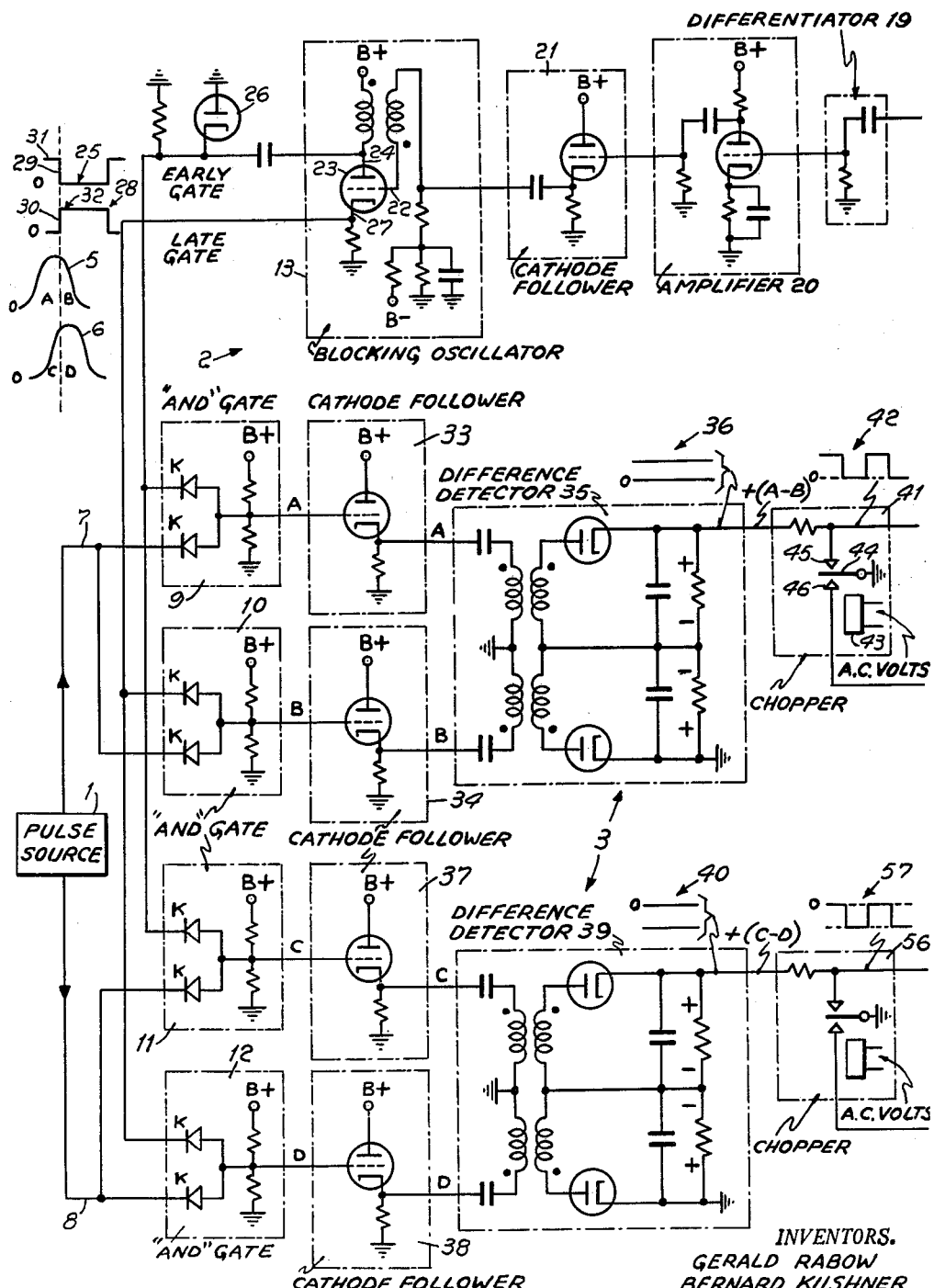

INVENTORS.
GERALD RABOW
BERNARD KUSHNER
BY Alfred C. Hill
AGENT

United States Patent Office 3,118,109
Patented Jan. 14, 1964

3,118,109
CENTER OF AREA TIME DISCRIMINATOR
Gerald Rabow and Bernard Kushner, Brooklyn, N.Y., assignors to International Telephone and Telegraph Corporation, Nutley, N.J., a corporation of Maryland
Filed May 25, 1959, Ser. No. 815,743
19 Claims. (Cl. 324—68)

This invention relates to time discriminators and more particularly to a center of area time discriminator.

A time discriminator is a circuit which indicates the time equality of two events or the sense and approximate magnitude of the inequality. In pulse systems, a time discriminator can determine the time relationship of a given portion of a pulse, such as the leading edge, the trailing edge, or the center of area of a pulse, with respect to a given time reference. The time reference for a time discriminator can be established by a given portion, such as a step portion, of a gating signal. The type of time discriminator to which the present invention relates includes a gate circuit responding to a given portion of an input pulse and the step portion of the gating signal. More particularly, the time discriminator of the present invention determines the time relationship of the center of area of a pulse, or, in other words, the center of a pulse, with reference to the time reference of a gating signal.

Prior art time discriminators of the latter type employ a pair of gate circuits which respond to gating signals having an abrupt transition portion, said abrupt transition portion representing the time reference. The gating signals may be a single pulse having a more positive portion activating one gate circuit and a more negative portion operating the other gate circuit with a step portion therebetween, or two pulses of opposite polarity with the more positive portion or more negative portion of each pulse sequentially activating its corresponding gate circuits. The step portion of each of the pulses are in time coincidence and provide the time reference. The gate circuits respond to the gating signals to separate an input pulse into two portions on a time basis. The difference in area is recognized by comparing the area of each of the portions of the signal input pulse. A utilization device, such as a null detector, can indicate this area difference, and hence a shift of the pulse center. If the utilization device is an intelligence responsive device, it will be possible to recover intelligence conveyed by shifting the time position of the center of a pulse in accordance therewith.

Time discriminators operating on a multiplex pulse signal, such as encountered in multiplex communication systems and certain distance measuring systems employing echo techniques, will also function to separate a particular one of the pulses of the multiplex signal from the multiplex signal, due to the timing of the gating signal.

The above prior art time discriminators rely upon a gating signal which is internally generated and timed and hence will function without regard to the timing of the input signal. The lack of synchronization between the received signals and the gating signal would be detrimental to the operation of pulse systems employed for conveying intelligence due to phase shifts that take place in the communication path as the signal travels from transmitter to receiver.

Therefore, an object of this invention is to provide an improved center of area time discriminator.

Another object of this invention is to provide a time discriminator which corrects the time relationship of the gating or timing signal relative to the center of input pulse signals.

Still another object of this invention is to provide a time discriminator which corrects the time relationship of the gating or timing signal relative to the average center of the areas of a pair of input pulse signals.

A further object of this invention is to provide a time discriminator which indicates the time relationship, in both sense and magnitude, between the centers of area of two pulses. If said time relationship is varied in accordance with intelligence, the output of said time discriminator will provide an intelligence signal.

A feature of this invention is the provision of a time discriminator including means to compare the time position of the center of input pulses with a given time position of a reference signal to produce a control signal proportional to the time difference therebetween and means to couple the control signal to the source of the reference signal to adjust said given time position of said reference signal for a predetermined time relationship with respect to the center of the input pulses.

Another feature of this invention is the provision of a time discriminator including means to compare the time position of the average center of areas of two pulses with a given time position of a reference signal to produce a control signal proportional to the time difference therebetween and means to couple said control signal to the source of reference signal to adjust said given time position of said reference signal for time coincidence with said time position of said average center of areas of said two pulses.

Still another feature of this invention is the provision of a time discriminator including, in addition to the above-mentioned components, a means responsive to the deviation of the centers of the two pulses from the adjusted time position of said reference signal. Said means responsive may be an indicator to indicate the difference between the centers of the pairs of input pulses, or, if the deviation or difference of the centers of the two pairs of pulses is varied in time in accordance with intelligence, the time discriminator will demodulate this time variation and convert it into a signal useful for visible or audible reproduction or for control purposes.

A further feature of this invention is the provision of a time discriminator operating on a source of first and second pulses, said second pulse including a portion in time coincidence with a portion of said first pulse and a source of reference signals having a time relationship with respect to said first and second pulses to include in their gate interval at least a portion of said first and second pulses.

Still a further feature of this invention is the provision of four coincident gate circuits activated by an early and late gate, two of said gate circuits operating in conjunction with the early and late gate to divide a first input pulse into early and late portions and two other of said gate circuits operating to divide the second input pulse into early and late portions. Means are provided to determine the difference of area in the early and late portion of the first pulse and the early and late portion of the second pulse, said difference of area of the early and late portions of each of said pulses being compared to provide the desired control signal to adjust the timing of said early and late gate to render the difference of area of the early and late portions of the first pulse and the difference of area of the early and late portions of the second pulse equal. There is further provided in conjunction with the coincident gate circuits a circuit to utilize the difference of differences of the portions of the two input pulses to provide a signal proportional to the deviation of the centers of the input pulse, said last-mentioned signal being an intelligence signal if said deviation is varied in accordance with intelligence.

Another further feature of this invention is the provision of a gate pulse generator including a blocking oscillator triggered by the differentiated output of a delay multivibrator wherein the bias on the delay multivibrator is varied in accordance with the control signal produced in accordance with the inequality between the difference of areas of the early and late portions of the first input pulse and the difference of areas of the early and late portions of the second input pulse to adjust the timing of the gate outputs of the blocking oscillators to render these differences equal.

Figure 1A:
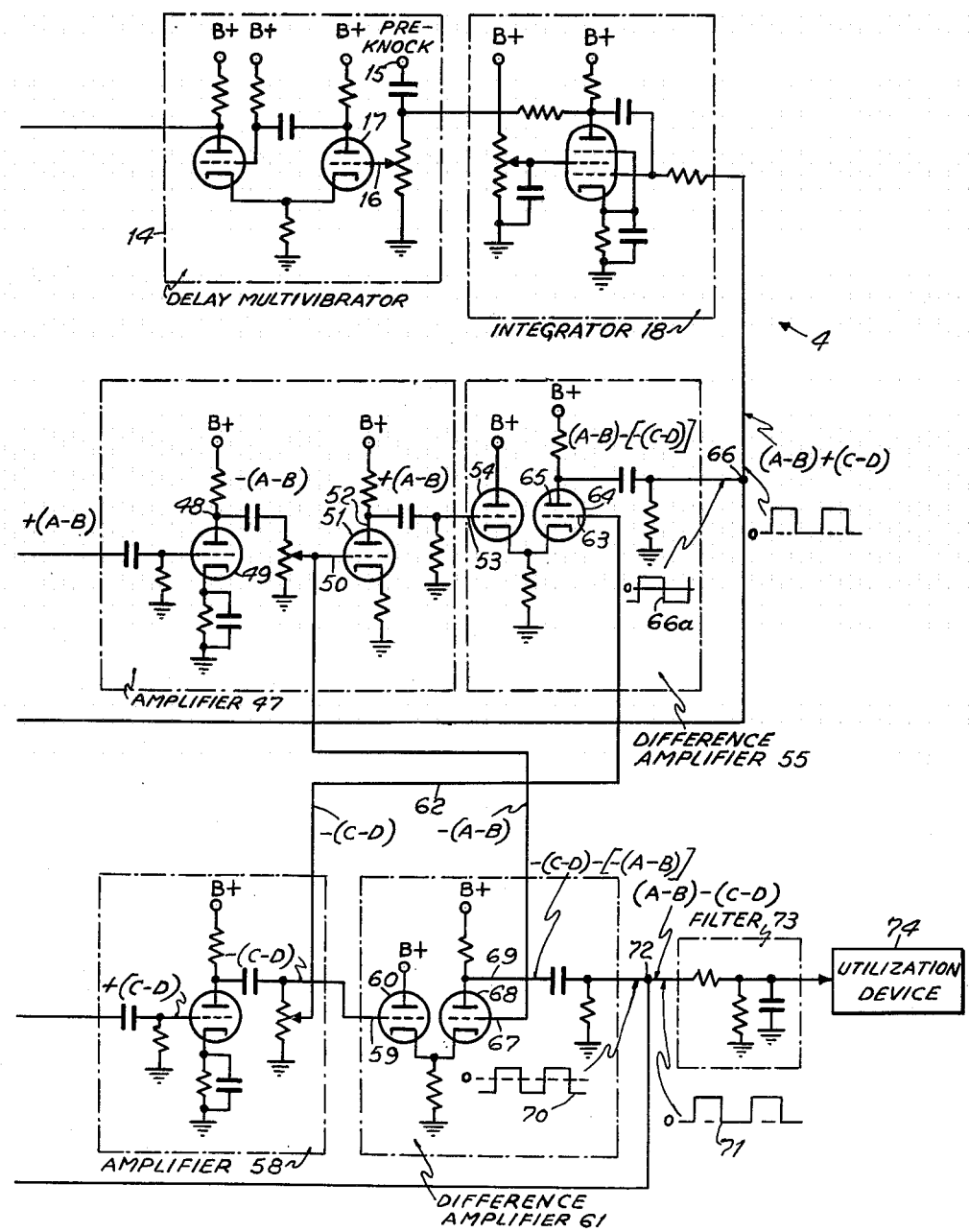

The above-mentioned and other features and objects of this invention will become more apparent by reference to the following description taken in conjunction with the accompanying drawing, in which:

FIGS. 1 and 1A are a schematic diagram of an embodiment of a time discriminator following the principles of this invention.

Referring to FIGS. 1 and 1A, there is illustrated a schematic drawing of an embodiment of a time discriminator of this invention including, broadly, a source of pulses 1, a means to produce a reference signal 2, said reference signal having a given time position relative to the center of the pulses of said source of pulses, a comparison means 3 to compare the time position of the center of said pulses of said source of pulses with said given time position of said reference signal to produce a control signal proportional to the time difference therebetween and means 4 to couple the control signal to reference signal producing means 2 to adjust said given time position of said reference signal for a predetermined time relationship with respect to the center of said pulses of source 1.

While the detailed description hereinbelow is concerned with determining and adjusting the time relationship of a reference signal with respect to the average center of areas of two pulses, the same general relationship particularly to the feedback control path between the comparison means 3 and the source 2 could be employed with respect to a single pulse input wherein the timing of the gate pulse output of the reference signal means 2 is adjusted for time coincidence with the center of the signal pulse to thereby establish a synchronization between a distant transmitter of the signal pulse and the receiver in which the time discriminator might be employed. It should be further noted that with respect to the pair of pulse inputs the feedback circuit between comparison means 3, reference signal producing means 2 can be utilized to synchronize the operation of a receiver with respect to a distant transmitter to thereby establish the proper time relationship for the timing waveforms which may be utilized in circuitry other than the time discriminator. Hence, the feedback circuitry of the time discriminator of this invention may be utilized, in addition to recovery or indication of the deviation between the centers of the two pulses, to synchronize a receiver with a distant transmitter.

Pulse source 1 can be any equipment that will generate or produce or receive, such as a communication receiver, two pulses, such as pulses 5 and 6, having a portion of each pulse in time coincidence. Pulses 5 and 6 may be modulated at a distant transmitter to convey intelligence by shifting the time relationship between the centers of pulses 5 and 6. Said intelligence may be in the form of telemetering data or may be for the purposes of voice communication. Pulse source 1 would in certain instances necessitate the incorporation therein of an arrangement to separate pulse 5 from pulse 6 for application to appropriate inputs of the time discriminator of this invention. For purpose of the detailed description to follow, assume that through a time switching arrangement in source 1 pulse 5 is connected to conductor 7 and pulse 6 is connected to conductor 8, conductors 7 and 8 providing the signal inputs to the discriminator of this invention.

Comparison means 3 includes four coincident gate circuits illustrated to be "AND" gates 9, 10, 11 and 12 which operate in conjunction with the gate signal outputs of reference signal producing means 2 to divide pulses 5 and 6, respectively, into early and late portions. The outputs of "AND" gates 9 to 12 are coupled to difference circuits including means to compare the difference of areas of the early and late portions of pulse 5, to compare the difference of area of the early and late portions of pulse 6, and to compare the resultant difference of areas of the portions of pulse 5 with the resultant difference of areas of the portions of pulse 6 to produce a control signal to adjust the timing of the output signal of reference signal producing means 2 to render the difference of the areas of the portions of pulse 5 and the difference of the areas of the portions of pulse 6 equal.

Looking at the circuitry in more detail, reference signal producing means 2 includes a blocking oscillator 13 and a delay multivibrator 14 as the primary components thereof. A preknock pulse is applied at terminal 15 prior to the application of pulses 5 and 6 to the conductors 7 and 8 to ready delay multivibrator 14 for operation. The bias coupled to grid 16 of electron discharge device 17 of delay multivibrator 14 is biased at a predetermined level by means of the circuitry illustrated in integrator 18. Hence, delay multivibrator 14 produces an output pulse whose trailing edge is differentiated in differentiator 19 to provide a trigger pulse which is coupled by means of amplifier 20 and cathode follower 21 to the control grid 22 of electron discharge device 23 to activate blocking oscillator 13. The timing of the trigger pulse produced by differentiator 19 is controlled by changing the bias on grid 16 of delay multivibrator 14 to change the time position of the trailing edge of the output pulse therefrom. A change in bias on grid 16 effectively changes the time delay of multivibrator 14. Activation of blocking oscillator 13 produces at anode 24 an early gate, indicated by pulse 25, clamped to a zero level by diode 26 and at cathode 27 a late gate, indicated by pulse 28. As illustrated in the curves, pulse 25 and pulse 28 include a step portion 29 and 30, respectively, which are in time coincidence, said time coincidence of step portions 29 and 30 providing a time reference for the operation of the time discriminator of this invention.

Input pulse 5 is coupled to "AND" gate 9 and also to "AND" gate 10 along conductor 7. The early gate is coupled from anode 24 of electron discharge device 23 to "AND" gate 9 to thereby permit an output voltage from "AND" gate 9 proportional to the area A of pulse 5, said output being possible by means of the more positive portion 31 of early gate 25 being time coincident with portion A. The late gate is coupled from cathode 27 of electron discharge device 23 to "AND" gate 10 so that the positive portion 32 of gate 28 time coincident with portion B will produce an output voltage from "AND" gate 10 proportional to the area B of pulse 5. Hence, due to the operation of the early gate and late gate "AND" circuits 9 and 10 have divided input pulse 5, respectively, into an early portion and a late portion. The output voltages of "AND" circuits 9 and 10 are coupled by means of cathode followers 33 and 34 to difference detector 35 to produce at the output thereof a direct current (D.C.) voltage, as illustrated in curve 36, proportional to the difference between the areas of the early and late portions A and B.

Input pulse 6 of the pulse pair from pulse source 1 is coupled by means of conductor 8 to the input of "AND" gates 11 and 12. The early gate from anode 24 of electron discharge device 23 is coupled to the input of "AND" gate 11 while the late gate coupled from cathode 27 of electron discharge device 23 is coupled to the input of "AND" gate 12. The positive portion 31 of early gate 25 is time coincident with the early portion C of pulse 6 and hence produces an output voltage proportional to the area C from "AND" gate 11. The positive portion 32 of late gate 28 is time coincident with the late portion D of pulse 6 and, hence, an output voltage proportional to the area D is produced at the output of "AND" gate 12. The voltages C and D are, respectively, coupled by means of cathode followers 37 and 38 to difference detector 39 which produces at the output thereof a D.C. voltage, illustrated in curve 40, proportional to the difference between the areas of portions C and D.

The designation of the voltage at the output of difference detectors 35 and 39 are algebraic representations. That is, the representation $+(A-B)$ at the output of detector 35 would become a negative quantity if the area B were larger than the area A. However, as illustrated, this quantity will be a positive quantity since area A is larger than area B. With respect to the output difference detector 39, the quantity $+(C-D)$ is a negative quantity in the present exemplary illustration since area D is larger than area C. The polarity of the voltages proportional to the difference of the area of the early and late portions of pulses 5 and 6 at the output of detectors 35 and 39 are, as illustrated in curves 36 and 40, $$+(A-B)-(C-D)$$

with the time relationship of pulses 5 and 6 as illustrated. The polarity of the voltage proportional to $(A-B)$ and $(C-D)$ will reverse if the time relationships of pulses 5 and 6 are reversed.

The D.C. output of detector 35 is coupled to chopper 41 to convert the D.C. voltages at the output thereof to an alternating (A.C.) voltage as illustrated in curve 42. This is accomplished in chopper 41 by applying a sine wave voltage, such as the 60 cycle or 400 cycle voltage output of a power supply, to solenoid 43 to thereby alternately swing armature 44 between contacts 45 and 46. Hence, chopper 41 places ground potential on contacts 45 and 46 alternately at the frequency of the alternating voltage coupled to solenoid 43 thereby converting the D.C. quantity at the output of detector 35 to an A.C. quantity having a frequency equal to the frequency of the A.C. voltage coupled to solenoid 43. This conversion from D.C. to A.C. by means of chopper 41 enables the utilization of A.C. amplifiers for amplifying the resultant voltage due to the difference of the areas of the early and late portions of pulse 5. As illustrated the A.C. output 42 of chopper 41 is coupled to amplifier 47 in which the polarity of $(A-B)$ is inverted and hence results in a quantity $-(A-B)$ at the anode 48 of electron discharge device 49. The output of anode 48 is coupled to grid 50 of electron discharge device 51 and hence to the anode 52 thereof for further amplification and another phase inversion returning the voltage to $+(A-B)$. The voltage at anode 52 of electron discharge device 51 is coupled to grid 53 of electron discharge device 54 of difference amplifier 55.

If the quantity $(A-B)$ were coupled directly to reference signal producing means 2 it would be possible to adjust the timing of the gate outputs thereof for time coincidence with the center of the pulse 5. However, in accordance with the schematic illustrated herein, the time discriminator is functioning to adjust the timing of time coincident step portions of early and late gates 25 and 28 for time coincidence with the average center of areas of pulses 5 and 6. This necessitates employing the output of detector 39 as explained hereinbelow.

The output of detector 39, $+(C-D)$, is coupled to chopper 56 which operates as described hereinabove with respect to chopper 41 to convert the D.C. voltage at the output of detector 39 to an A.C. voltage as indicated in curve 57. The alternating quantity $+(C-D)$ is coupled to a single stage amplifier 58 which amplifies the A.C. quantity and inverts the polarity thereof. The quantity $$-(C-D)$$

is then coupled to control grid 59 of electron discharge device 60 of difference amplifier 61.

The desired control signal, proportional to the time difference between the time position of steps 29 and 30 of gates 25 and 28 and the average center of areas of pulses 5 and 6, is developed as follows. The output, $-(C-D)$, of amplifier 58 is coupled by means of conductor 62 to control grid 63 of electron discharge device 64 forming the other half of difference amplifier 55. The resultant output at anode 65 of electron discharge device 64 is $(A-B)-[-(C-D)]$, or in other words, $$(A-B)+(C-D)$$

This quantity is proportional, in both magnitude and sense to the time difference of the time position of the step portions of gates 25 and 28 with respect to the average center of area of pulses 5 and 6. If $(A-B)$ equals $(C-D)$ then there is no time difference and hence, a zero control signal. However, if $(A-B)$ does not equal $(C-D)$ then there is a time difference and a control signal is developed having the proper magnitude and sense to control, in the manner hereinbelow described, the time position of the step portions 29 and 30 of gates 25 and 28 to render the difference of area of portions A and B equal to the difference of area of portions C and D and thereby position steps 29 and 30 at the desired time position.

The output of difference amplifier 55 is, as pointed out hereinabove, $(A-B)+(C-D)$. Remembering that area D, in the example illustrated, is larger than area C, and that area A is larger than area B, then the control signal can be expressed mathematically as $(A-B)-(D-C)=0$. For the reverse time relationship between pulses 5 and 6 and hence the reverse magnitude relationship between areas A and B and areas C and D the control signal can be mathematically expressed as $$(C-D)-(B-A)=0$$

At point 66, the output of amplifier 55, the quantity $(A-B)+(C-D)$ has its zero reference axis (D.C. level) in the center thereof as illustrated in curve 66a. This is the usual location of the D.C. reference level when amplification takes place in an A.C. amplifier including capacitors which remove any D.C. level present. To convert the quantity at the output of electron discharge device 64 to a D.C. voltage the other half of chopper 41 comes into play. Namely, armature 44 alternately connects ground potential to contact 46. This places point 66 at ground potential at the rate of the A.C. voltage coupled to solenoid 43 and, hence, reinserts the D.C. level of the resultant voltage at the output of difference amplifier 55.

The resultant output voltage of amplifier 55 is coupled to integrator 18 wherein a smoothing action takes place so that a control signal in the form of a D.C. voltage is coupled to the bias circuitry of control grid 16 of multivibrator 14 to adjust the amount of bias applied to grid 16 in accordance with the control signal. This will adjust the time delay of multivibrator 14 in step with the control signal to thereby alter the time position of the trailing edge of the output pulse therefrom. A change in the time position of the trailing edge of the output pulse multivibrator 14 shifts the time position of the trigger pulse produced in differentiator 19 to activate blocking oscillator 13. A change in the time of activating oscillator 13 results in a shift of the time position of steps 29 and 30 of gates 25 and 28 in accordance with the control voltage developed in difference amplifier 55.

Having adjusted the time reference to the desired location namely, the average center of areas of pulses 5 and 6, it would be desirable to obtain a signal representative of the deviation of the centers of pulses 5 and 6 from this time reference point. This is accomplished by coupling the output of electron discharge device 49 of amplifier 47, $-(A-B)$, to control grid 67 of electron discharge device 68 of difference amplifier 61. The resultant signal at anode 69 of electron discharge device 68 of difference amplifier 61 is $-(C-D)-[-(A-B)]$ or $(A-B)-(C-D)$. This quantity represents mathematically a difference of the differences of the areas of the early and late portions of pulses 5 and 6 respectively, and represents a signal proportional to deviation of the centers of pulses 5 and 6 from the established time reference.

The output of difference amplifier 61, like difference amplifier 55, is also an A.C. voltage with the D.C. reference level in the center of the output voltage. To convert the A.C. voltage to a pulsating D.C. voltage, as illustrated in curve 71, the second half of chopper 56 is brought into play as it was in connection with chopper 41. Chopper 56 alternately places point 72 at ground potential at a rate determined by the frequency of the alternating voltage coupled to the solenoid of chopper 56. The pulsating D.C. voltage at point 72 is smoothed and substantially integrated by means of filter 73 to develop a signal proportional to the deviation of the center of the pulses from the average center of area of the two input pulses 5 and 6. This signal at the output of filter 73 will be coupled to a utilization device 74 which may take the form of null detector to give an indication of when the proper relationship between the input pulses and reference signal has been reached or how far the pulse centers have deviated from the time reference. Utilization device 74 may also be a device to recover intelligence, if the time displacement between the centers of pulses 5 and 6 have been varied at a distant transmitter in accordance with intelligence. Hence, if the time variation of the signal is in accordance with intelligence, the discriminator of this invention demodulates this intelligence and converts it into a signal useful for visible or audible indication or for control purposes in device 74.

With respect to the signals at points 66 and 72, it should be remembered that these are only illustrative waveforms illustrated at these points. If the difference $(A-B)$ is greater than the difference $(C-D)$ naturally the waveforms will be in a positive direction as illustrated. However, if the difference $(C-D)$ is greater than the difference $(A-B)$ then the voltage will be in a negative direction thereby enabling the determination not only of the magnitude of the deviation between the centers of areas of two pulses but also the sense or direction of this deviation.

While we have described above the principles of our invention in connection with specific apparatus, it is to be clearly understood that this description is made only by way of example and not as a limitation to the scope of our invention as set forth in the objects thereof and in the accompanying claims.

We claim:

1. A time discriminator comprising a source of two positive pulses, means to produce a reference signal having a given time position relative to the centers of said two pulses to establish a predetermined time relationship between said given time position of said reference signal and the centers of said two pulses, means coupled to said source and said reference signal producing means to compare the time position of the centers of said two pulses with said given time position of said reference signal to produce a control signal proportional to the time difference between said time positions and means to couple said control signal to said reference signal producing means to adjust said given time position of said reference signal to maintain said predetermined time relationship.

2. A time discriminator comprising a source of two positive pulses, means to produce a reference signal having a given time position relative to said two pulses, means coupled to said source and said reference signal producing means to compare the time position of the average center of areas of said two pulses with said given time position of said reference signal to produce a control signal proportional to the time difference therebetween and means to couple said control signal to said reference signal producing means to adjust said given time position of said reference signal for time coincidence with said time position of said average center of areas of said two pulses.

3. A time discriminator comprising a source of two positive pulses, means to produce a reference signal having a given time position relative to said two pulses, means coupled to said source and said reference signal producing means to compare the time position of the average center of areas of said two pulses with said given time position of said reference signal to produce a control signal proportional to the time difference therebetween, means to couple said control signal to said reference signal producing means to adjust said given time position of said reference signal for time coincidence with said time position of said average center of areas of said two pulses, and means coupled to said comparison means to utilize the deviation of the centers of said two pulses from said adjusted time position of said reference signal.

4. A time discriminator comprising two sources of pulses, means to produce a reference signal including a step portion having a given time position relative to the pulses of said two sources of pulses, means coupled to each of said sources and said reference signal producing means to compare the time position of the average center of areas of a pair of pulses with said given time position of said step portion to produce a control signal proportional to the time difference between said time positions, one pulse of said pair of pulses being from one of said sources of pulses and the other pulse of said pair of pulses being from the other of said sources of pulses, and means to couple said control signal to said reference signal producing means to adjust said given time position of said step portion for time coincidence with said time position of said average center of areas of said pair of pulses.

5. A time discriminator comprising two sources of pulses, means to produce a reference signal including a step portion having a given time position relative to the pulses of said two sources of pulses, means coupled to each of said sources and said reference signal producing means to compare the time position of the average center of areas of a pair of pulses with said given time position of said step portion to produce a control signal proportional to the time difference between said time positions, one pulse of said pair of pulses being from one of said sources of pulses and the other pulse of said pair of pulses being from the other of said sources of pulses, and means to couple said control signal to said reference signal producing means to adjust said given time position of said step portion for time coincidence with said time position of said average center of areas of said pair of pulses and means coupled to said comparison means to utilize the deviation of the centers of said pair of pulses from said adjusted time position of said step portion.

6. A time discriminator comprising a source of first and second pulses, said second pulse including a portion in time coincidence with a portion of said first pulse, means to produce a reference signal including a step portion having a given time position relative to the time coincident portions of said first and second pulses, means coupled to said source and said reference signal producing means to compare the time position of the average center of areas of said first and second pulses with said given time position of said step portion to produce a control signal proportional to the time difference therebetween and means to couple said control signal to said reference signal producing means to adjust said given time position of said step portion for time coincidence with said time position of said average center of areas of said first and second pulses.

7. A time discriminator comprising a source of first and second pulses, said second pulse including a portion in time coincidence with a portion of said first pulse, means to produce a reference signal including a step portion having a given time position relative to the time coincident portions of said first and second pulses, means coupled to said source and said reference signal producing means to compare the time position of the average center of areas of said first and second pulses with said given time position of said step portion to produce a control signal proportional to the time difference therebetween, means to couple said control signal to said reference signal producing means to adjust said given time position of said step portion for time coincidence with said time position of said average center of areas of said first and second pulses and means coupled to said comparison means to utilize the deviation of the centers of said first and second pulses from said adjusted time position of said step portion.

8. A time discriminator comprising a source of two pulses, means coupled to said source to divide each of said pulses into two portions, means coupled to said dividing means to compare the difference of the areas of said portions of one of said pulses with the difference of the areas of said portions of the other of said pulses to produce a control signal proportional to the inequality of said differences and means to couple said control signal to said dividing means for adjustment thereof to render said differences equal.

9. A time discriminator comprising a source of two pulses, means coupled to said source to divide each of said pulses into two portions, means coupled to said dividing means to compare the difference of the areas of said portions of one of said pulses with the difference of the areas of said portions of the other of said pulses and to produce a control signal proportional to the inequality of said differences, means to couple said control signal to said dividing means for adjustment thereof to render said differences equal, and means responsive to the differences of said differences to provide a signal proportional to the deviation between the centers of area of said pair of pulses.

10. A time discriminator comprising a source of two pulses, means coupled to said source to divide each of said pulses on a time basis into two portions, means coupled to said dividing means to compare the difference of the areas of said portions of one of said pulses with the difference of the areas of said portions of the other of said pulses and to produce a control signal proportional to the inequality of said differences and means to couple said control signal to said dividing means for adjustment thereof to render said differences equal.

11. A time discriminator comprising a source of two pulses, means coupled to said source to divide each of said pulses on a time basis into two portions, means coupled to said dividing means to compare the difference of the areas of said portions of one of said pulses with the difference of the areas of said portions of the other of said pulses and to produce a control signal proportional to the inequality of said differences, means to couple said control signal to said dividing means for adjustment thereof to render said differences equal, and means responsive to the difference of said differences to provide a signal proportional to the deviations between the centers of area of said pair of pulses.

12. A time discriminator comprising a source of two pulses, means coupled to said source to separate each of said pulses into an early and late portion, means coupled to said separating means to compare the difference of the areas of said early and late portions of one of said pulses with the difference of the areas of said early and late portions of the other of said pulses and to produce a control signal proportional to the inequality of said differences and means to couple said control signal to said separating means for adjustment thereof to render said differences equal.

13. A time discriminator comprising a source of two pulses, means coupled to said source to separate each of said pulses into an early and late portion, means coupled to said separating means to compare the difference of the areas of said early and late portions of one of said pulses with the difference of the areas of said early and late portions of the other of said pulses and to produce a control signal proportional to the inequality of said differences, means to couple said control signal to said separating means for adjustment thereof to render said differences equal and means responsive to the difference of said differences to provide a signal proportional to the deviation betwen the centers of area of said pair of pulses.

14. A time discriminator comprising a source of a pair of pulses, a source of gate signals, means coupled to each of said sources responsive to said gate signals to separate each of the pulses of said pair of pulses into an early and late portion, means coupled to said responsive means to compare the difference of areas of said early and late portions of one pulse of said pair of pulses with the difference of areas of said early and late portions of the other pulse of said pair of pulses and to produce a control signal proportional to the inequality of said differences and means coupling said control signal to said source of gate signals to adjust the timing of said gate signals for coincidence with the average center of areas of the pulses of said pair of pulses.

15. A time discriminator comprising a source of a pair of pulses, a source of gate signals, means coupled to each of said sources responsive to said gate signals to separate each of the pulses of said pair of pulses into an early and late portion, means coupled to said responsive means to compare the difference of areas of said early and late portions of one pulse of said pair of pulses with the difference of areas of said early and late portions of the other pulse of said pair of pulses and to produce a control signal proportional to the inequality of said differences, means coupling said control signal to said source of gate signals to adjust the time of said gate signals for coincidence with the average center of area of the pulses of said pair of pulses and means responsive to the difference of said differences to provide a signal proportional to the deviation between the centers of area of said pair of pulses.

16. A time discriminator comprising a source of a pair of pulses, a source of gate signals including a first gate pulse and a second gate pulse in time sequence, a first coincident gate circuit, a second coincident gate circuit, means coupling one pulse of said pair of pulses to said first and second gate circuits, means coupling said first gate pulse to said first gate circuit to pass an early portion of said one pulse to the output thereof, means coupling said second gate circuit to pass a late portion of said one pulse to the output thereof, a first comparison means coupled to the output of said first and second gate circuits to compare the area of said early portion of said one pulse with the area of said late portion of said one pulse to provide a first voltage proportional to the area difference thereof, a third coincident gate circuit, a fourth coincident gate circuit, means coupling the other pulse of said pair of pulses to said third and fourth gate circuits, means coupling said first gate pulse to said third gate circuit to pass an early portion of said other pulse to the output thereof, means coupling said second gate pulse to said fourth gate circuit to pass a late portion of said other pulse to the output thereof, a second comparison means coupled to the output of said third and fourth gate circuits to compare the area of said early portion of said other pulse with the area of said late portion of said other pulse to provide a second voltage proportional to the area difference thereof, a difference amplifier, means to couple said first voltage to said difference amplifier, means to couple said second voltage with reversed polarity to said difference amplifier, means coupled to the output of said difference amplifier to produce a control voltage proportional to the difference in amplitude of said first and second voltages, and means to couple said control voltage to said source of gate signals to adjust the timing of said first and second gate pulses to render said first and second voltages equal.

17. A time discriminator comprising a source of a pair of pulses, a source of gate signals including a first gate pulse and a second gate pulse in time sequence, a first coincident gate circuit, a second coincident gate circuit, means coupling one pulse of said pair of pulses to said first and second gate circuits, means coupling said first gate pulse to said first gate circuit to pass an early portion of said one pulse to the output thereof, means coupling said second gate pulse to said second gate circuit to pass a late portion of said one pulse to the output thereof, a first comparison means coupled to the output of said first and second gate circuits to compare the area of said early portion of said one pulse with the area of said late portion of said one pulse to provide a first voltage proportional to the area difference thereof, a third coincident gate circuit, a fourth coincident gate circuit, means coupling the other pulse of said pair of pulses to said third and fourth gate circuits, means coupling said first gate pulse to said third gate circuit to pass an early portion of said other pulse to the output thereof, means coupling said second gate pulse to said fourth gate circuit to pass a late portion of said other pulse to the output thereof, a second comparison means coupled to the output of said third and fourth gate circuits to compare the area of said early portion of said other pulse with the area of said late portion of said other pulse to provide a second voltage proportional to the area difference thereof, a first difference amplifier, means to couple said first voltage to said first difference amplifier, means to couple said second voltage with reversed polarity to said first difference amplifier, means coupled to the output of said first difference amplifier to produce a control voltage proportional to the difference in amplitude of said first and second voltages, means to couple said control voltage to said source of gate signals to adjust the timing of said first and second gate pulses to render said first and second voltages equal, a second difference amplifier, means to couple said second voltage with reversed polarity to said second difference amplifier, means to couple said first voltage with reversed polarity to said second difference amplifier and means coupled to the output of said second difference amplifier responsive to the difference between said first and second voltages to provide a signal proportional to the deviation between the centers of area of said pair of pulses.

18. A time discriminator comprising a source of a pair of pulses, a delay multivibrator and a differentiating circuit coupled thereto to produce a trigger pulse having a given time position, a blocking oscillator including an electron discharge device having at least a control electrode, an anode and a cathode, means coupling said trigger pulse to said control electrode to activate said blocking oscillator for production of gate pulses timed in accordance with said given time position, means coupled to said anode to remove a first gate pulse from said blocking oscillator, means coupled to said cathode to remove a second gate pulse from said blocking oscillator, a first coincident gate circuit, a second coincident gate circuit, means coupling one pulse of said pair of pulses to said first and second gate circuits, means coupling said first gate pulse to said first gate circuit to pass an early portion of said one pulse to the output thereof, means coupling said second gate pulse to said second gate circuit to pass a late portion of said one pulse to the output thereof, a first comparison means coupled to the output of said first and second gate circuits to compare the area of said early portion of said one pulse with the area of said late portion of said one pulse to provide a first voltage proportional to the area difference thereof, a third coincident gate circuit, a fourth coincident gate circuit, means coupling the other pulse of said pair of pulses to said third and fourth gate circuits, means coupling said first gate pulse to said third gate circuit to pass an early portion of said other pulse to the output thereof, means coupling said second gate pulse to said fourth gate circuit to pass a late portion of said other pulse to the output thereof, a second comparison means coupled to the output of said third and fourth gate circuits to compare the area of said early portion of said other pulse with the area of said late portion of said other pulse to provide a second voltage proportional to the area difference thereof, a difference amplifier, means to couple said first voltage to said difference amplifier, means to couple said second voltage with reversed polarity to said difference amplifier, an integrator circuit coupled to the output of said difference amplifier to produce a control voltage proportional to the difference in amplitude of said first and second voltages, and means coupling said control voltage to said delay multivibrator to alter the time delay thereof to adjust said given time position of said trigger pulse to render said first and second voltages equal.

19. A time discriminator comprising a source of a pair of pulses, a delay multivibrator and a differentiating circuit coupled thereto to produce a trigger pulse having a given time position, a blocking oscillator including an electron discharge device having at least a control electrode, an anode and a cathode, means coupling said trigger pulse to said control electrode to activate said blocking oscillator for production of gate pulses timed in accordance with said given time position, means coupled to said anode to remove a first gate pulse from said blocking oscillator, means coupled to said cathode to remove a second gate pulse from said blocking oscillator, a first coincident gate circuit, a second coincident gate circuit, means coupling one pulse of said pair of pulses to said first and second gate circuits, means coupling said first gate pulse to said first gate circuit to pass an early portion of said one pulse to the output thereof, means coupling said second gate pulse to said second gate circuit to pass a late portion of said one pulse to the output thereof, a first comparison means coupled to the output of said first and second gate circuits to compare the area of said early portion of said one pulse with the area of said late portion of said one pulse to provide a first voltage proportional to the area difference thereof, a third coincident gate circuit, a fourth coincident gate circuit, means coupling the other pulse of said pair of pulses to said third and fourth gate circuits, means coupling said first gate pulse to said third gate circuit to pass an early portion of said other pulse to the output thereof, means coupling said second gate pulse to said fourth gate circuit to pass a late portion of said other pulse to the output thereof, a second comparison means coupled to the output of said third and fourth gate circuits to compare the area of said early portion of said other pulse with the area of said late portion of said other pulse to provide a second voltage proportional to the area difference thereof, a first difference amplifier, means to couple said first voltage to said first difference amplifier, means to couple said second voltage with reversed polarity to said first difference amplifier, an integrator circuit coupled to the output of said first difference amplifier to produce a control voltage proportional to the difference in amplitude of said first and second voltages, means coupling said control voltage to said delay multivibrator to alter the time delay thereof to adjust said given time position of said trigger pulse to render said first and second voltages equal, a second difference amplifier, means to couple said second voltage with reversed polarity to said second difference amplifier, means to couple said first voltage with reversed polarity to said second difference amplifier, and means coupled to the output of said second difference amplifier responsive to the difference between said first and second voltages to provide a signal proportional to the deviation between the centers of area of said pair of pulses.

References Cited in the file of this patent
UNITED STATES PATENTS

| | | |
|---|---|---|
| 2,763,778 | Gleason | Sept. 18, 1956 |
| 2,794,979 | Palmer | June 4, 1957 |
| 2,807,015 | Shank | Sept. 17, 1957 |
| 2,814,725 | Jacobs et al. | Nov. 26, 1957 |
| 2,837,644 | Shallon | June 3, 1958 |